April 21, 1931.  J. I. SLATTERY  1,802,285
IMPLEMENT COUPLING FOR TRACTORS
Filed March 20, 1930
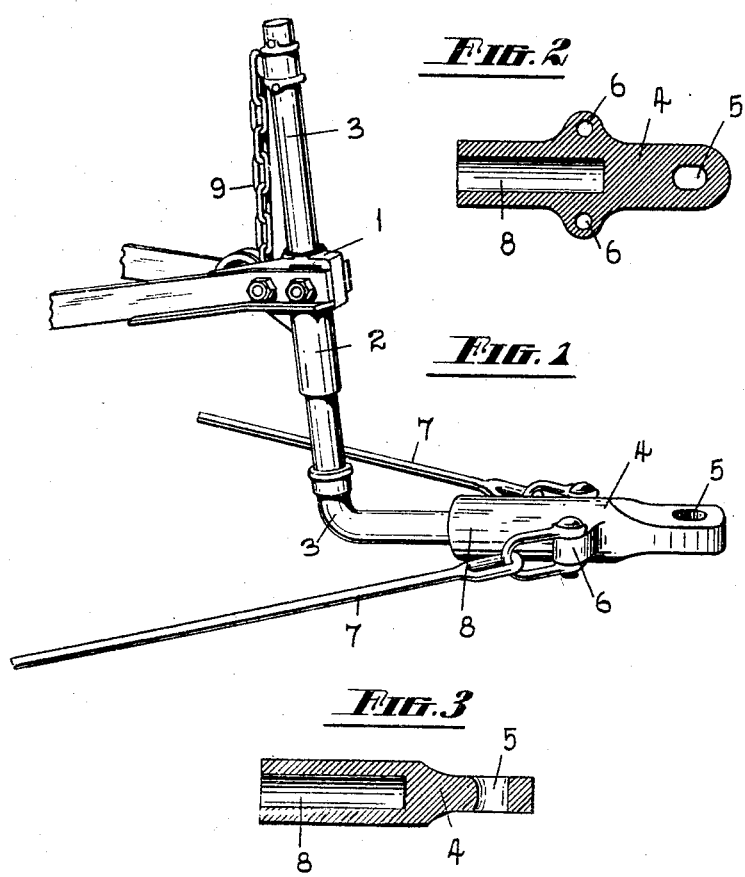
INVENTOR
John Ignatius Slattery
BY Munn & Co
ATTORNEYS Patented Apr. 21, 1931

1,802,285

UNITED STATES PATENT OFFICE

JOHN IGNATIUS SLATTERY, OF JAMESTOWN, AUSTRALIA, ASSIGNOR OF ONE-FOURTH TO WILLIAM FRANCIS SLATTERY, ONE-FOURTH TO JAMES SLATTERY, AND ONE-FOURTH TO LESTER MAURICE WOLFF JUDELL, ALL OF JAMESTOWN, AUSTRALIA

IMPLEMENT COUPLING FOR TRACTORS

Application filed March 20, 1930, Serial No. 437,559, and in Australia September 3, 1929.

The purpose of this invention is to provide an improved coupling for attaching the head of a drill combine or other implement to the draw bar of a tractor, the usual front wheels of the combine or implement being removed.

According to the usual construction heretofore adopted the goose neck or head of the combine or implement frame is slidable upon the vertical limb of an L-shaped stem upon which it is moved up and down to adjust its height, while the front end of the forwardly projecting horizontal limb of such L-shaped stem is widened out and provided with an elongated eye to take the pin of the tractor draw bar. The weight of the front of the implement is taken directly by such draw bar, and the pull is taken by two draught rods from the implement connected directly to such draw bar.

According to my invention I provide a specially devised coupling device between the tractor and the L-shaped stem, such coupling device consisting of a body in the form of a round bar having an eye at its front end to take the pin of the tractor draw bar and a perforated projecting lug upon each side to which the implement draught rods are attached and having its rear portion of tubular section forming a socket for the forward portion of the horizontal limb of the L-shaped stem.

In order that my invention may be the more clearly understood I will describe the same with reference to the accompanying drawings in which:—

Fig. 1 is a perspective view showing my coupling device fitted to the head of an implement.

Fig. 2 is a central horizontal section of my coupling device, and

Fig. 3 is a central vertical section of my coupling device.

In the drawings 1 represents the head of the implement having an approximately vertical boss 2 constructed after any usual or approved manner. 3 represents the L-shaped stem upon which the boss 2 is adjustable vertically, the horizontal limb of such stem being in the form of a plain round bar without any eye or flattened portion. 4 represents the coupling body which, when in use, is approximately horizontal as shown. In its front end is an eye 5 to take the draw bar pin whereby it is attached to the draw bar of the tractor. This eye is slightly elongated and is chamfered or rounded fairly deeply on its top and bottom rear edges and slightly on its top and bottom front edges; this allows the coupling or body 4 to rock with a fore and aft pitching movement about the pin without straining or breaking. Upon its sides are two perforated lugs 6, 6 which serve for the attachment of the draught rods 7, 7 of the combine or other implement. The tubular rear portion 8 takes the forwardly projecting horizontal limb of the L-shaped stem 3 as in a socket.

The boss 2 is raised or lowered upon the L-shaped stem 3 by means of the chain 9 connected to suitable raising and lowering gear of any usual or approved type, and the weight of the front of the implement is transferred through the L-shaped stem 3 and the body 4 to the tractor draw bar. The whole of the pull is transmitted through the body 4 and draught rods 7, 7. The horizontal limb of the stem 3 is capable of a slight rotational movement in the tubular portion of the body or coupling 4 when relative movement takes place between the planes of the tractor and of the implement. It may have also a very small movement backward and forward therein but this should not be necessary. No tension or draught is transmitted from the tractor to the implement through the horizontal part of the stem 3; all of the tension is taken by the draught rods 7, 7. The compression or push upon the coupling device or body 4 exerted by the implement when going down hill or caused by the retardation of velocity of the tractor or compression otherwise developed is taken up by the pressure of the forward end of the horizontal limb of the stem 3 against the forward end of the tubular part of the body 4.

What I claim is:—

1. An implement coupling device for tractors comprising an L-shaped stem attached to the head of the implement and having a forwardly projecting horizontal limb in the form of a plain round bar in combination with an elongated body having an eye at its front end a perforated lug upon each side and a tubular rear portion.

2. An implement coupling device for tractors comprising an elongated body having an eye at its front end to take the pin of the tractor draw bar, a perforated lug upon each side to take the draught rod connections to the implement, and having its rear portion of tubular section forming a socket in which the forwardly projecting horizontal limb of an L-shaped stem attached to the head of the implement may be inserted and may make a slight rotational movement as required.

In testimony that I claim the foregoing as my invention I have signed my name this 14th day of February, 1930.

JOHN IGNATIUS SLATTERY.